UNITED STATES PATENT OFFICE.

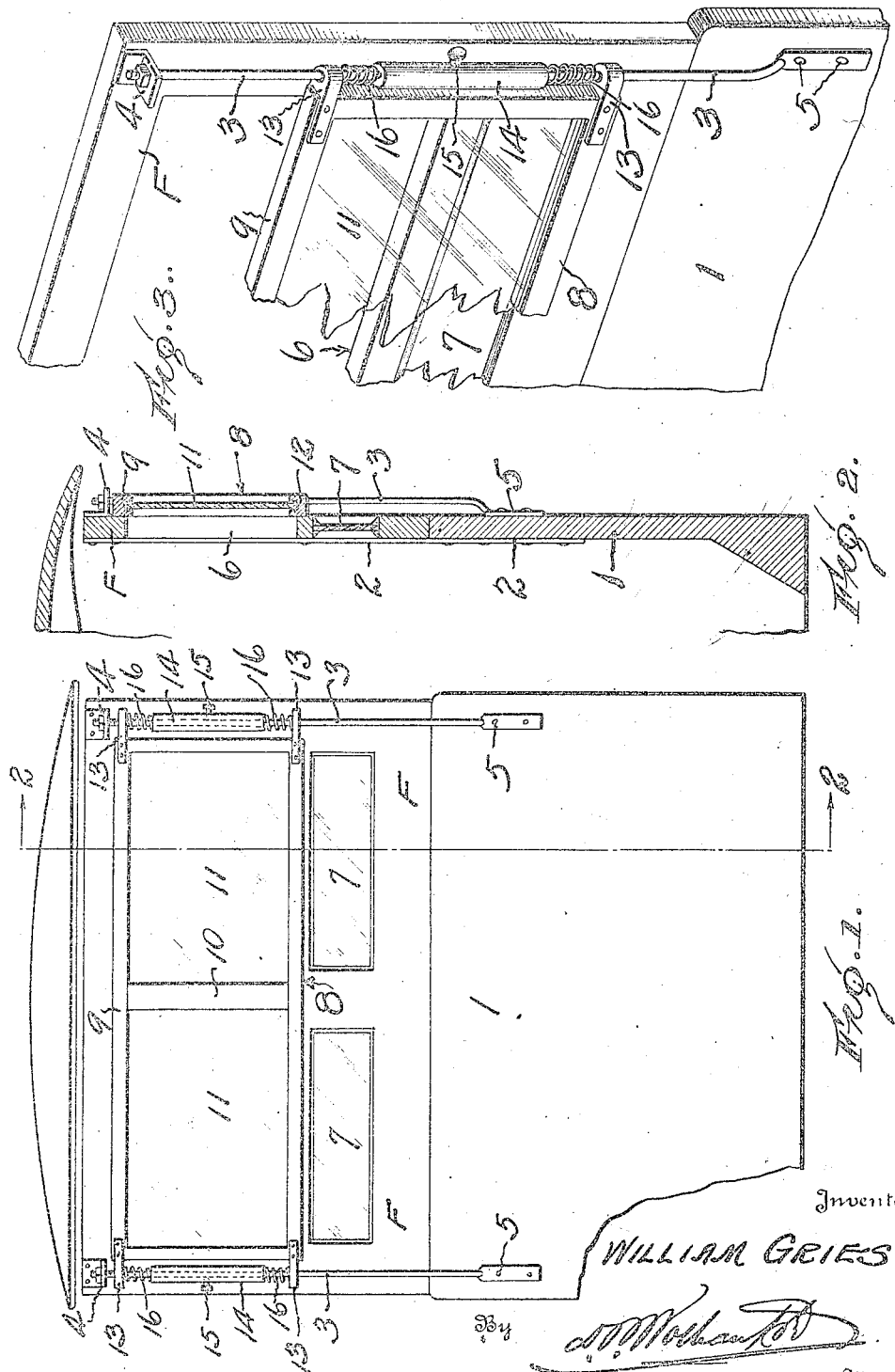

WILLIAM GRIES, OF NEWARK, NEW JERSEY.

WIND-SHIELD FOR MOTOR-TRUCKS.

1,262,329.	Specification of Letters Patent.	Patented Apr. 9, 1918.

Application filed May 25, 1917. Serial No. 170,934.

*To all whom it may concern:*

Be it known that I, WILLIAM GRIES, a citizen of the United States, residing at Newark, in the county of Essex and State of New Jersey, have invented certain new and useful Improvements in Wind-Shields for Motor-Trucks, of which the following is a specification.

This invention relates to wind shields, and more particularly to an improvement in shields or guards of this character for motor trucks or other heavy-duty vehicles.

The invention has for its principal object the provision of a wind shield construction having novel and effective means for protecting the shiftable section of the shield against breakage. That is to say, it is proposed to provide a wind-shield construction in which the driver's vision section is shiftably mounted upon a resilient support, entirely independent of the wind shield frame, whereby the severe shocks and jars of the vehicle will not be transmitted to the glass of the said section thereby reducing the liability of breakage from this cause to a minimum.

Another object of the invention is to provide a construction that is simple, durable, and readily accessible for adjustment and repair, thereby materially enhancing its value from a practical and commercial standpoint.

With the above and other objects in view which will more readily appear as the nature of the invention is better understood, the same consists in the novel construction, combination and arrangement of parts hereinafter more fully described, illustrated and claimed.

A preferred and practical embodiment of the invention is illustrated in the accompanying drawings, in which—

Figure 1 is a front elevation of the wind shield.

Fig. 2 is a vertical section on the line 2—2 of Fig. 1.

Fig. 3 is an enlarged detail perspective view of the wind shield construction showing more clearly the means of connecting the slidable window with the wind shield frame, and also showing the said window lowered from its normal position.

Similar reference characters designate corresponding parts throughout the several figures of the drawings.

As previously indicated, the present invention is especially adapted to motor trucks, or similar heavy vehicles, but it will, of course, be understood that the essential features thereof are necessarily susceptible of application to motor vehicles of other types. However, for purposes of illustration, the present invention is shown in the drawings, in connection with the cab of a motor truck, wherein the dash board, which forms the support for the wind shield, is designated generally by the numeral 1.

The improved wind shield construction, preferably includes a wind shield frame F securely fastened to the upper edge of the dash board or support by means of the fastening stays 2 carried at each side of the rear face of the frame, and also by means of the guide rods 3 located at the front side thereof, and which rods between their ends are spaced from the face of the frame and also from the upper portion of the support, whereby the movable panel of the wind shield may be slidably mounted as will presently appear. To provide for the guide rods subserving the dual function of guides and braces, the upper part of the frame F has fitted thereto the angle brackets 4, one member of which projects outwardly from the face of the frame and is formed with a suitable opening for receiving the upper threaded ends of the rods 3 whereby the latter may be provided with nuts to clamp the upper part of the frame thereto, while the lower ends of the rods are bent inwardly and rigidly secured, as indicated at 5, to the dash board 1. Thus, it will be apparent that the wind shield frame F is securely held on the upper edge of the dash board 1 by means of both the fastening stays 2 and guide rods 3.

Referring further to the frame F, it will be observed that the same is provided at its upper portion with a relatively large opening or driver's vision window 6, while directly beneath the latter are located a pair of small glazed windows 7—7. The said driver's vision window 6, is provided with a slidable sash panel 8 which preferably consists of a sash frame designated generally as 9 having an intermediate frame piece 10, and the separate panes of glass 11—11 which are mounted in the frame on suitable rubber gaskets or cushions 12 which give the glass a cushion mounting to thereby further assist in preserving the same.

Each corner of the sash frame 9 has secured thereto suitable perforated guide eyes 13 which are adapted to provide a loose guiding engagement with the body portion of the guide rods 3 whereby the entire sash member may be readily moved up and down to cover and uncover the driver's vision opening 6, and to provide for mounting this sash panel on the guide rods, so that the shocks and jars of the vehicle will not be directly transferred thereto, novel supporting elements are utilized. These novel supporting elements are mounted on each guide rod 3 and essentially comprise a locking sleeve 14 slidable on the guide rods, and having a locking set screw 15 which may be screwed into binding engagement with the rod to hold the sleeve in a fixed position thereon, and the coiled shock absorbing spring 16 located between each end of the sleeve, and its adjacent guide eye 13. Thus, the entire sliding sash panel 8 is resiliently supported by the locking sleeves 14, so that when the sleeves are locked in any desired position on the rods, the entire sash will be supported by the springs 16, which, because of their arrangement will effectually take up all vertical movement incident to the traveling of the vehicle over rough road surfaces.

From Fig. 3, it will be apparent that the sliding sash element 8 may be readily lowered when desired to uncover a portion of the driver's vision opening in the frame, and it will also be observed that the guide rods 3 are of sufficient length to permit the sash to be lowered completely on a line with the edge of the opening or window 6. In any position of the sash, the same will always be supported through the medium of the springs 16 and therefore, under all conditions of use, the shocks and jars of the vehicle will be taken up by the said spring, and thus reduce the liability of glass breakage from this cause to a minimum. The smaller permanent windows 7 in the wind shield frame, while, of course, subjected to the vibrations of the vehicle, will not, because of their relatively small size, be seriously affected thereby, and will serve to provide a greater range of vision for the driver.

From the foregoing, it will be apparent that the present invention provides a wind shield construction for heavy-duty vehicles wherein the relatively large glass for the driver's vision opening will be protected from the severe shocks and jars incident to carrying heavy loads over rough roadways, while at the same time providing other transparent sections which enlarge the range of the driver's vision, but are of such size and so arranged in the frame that they are not affected by the conditions which would affect the larger transparent element of the slidable sash element.

Without further description, it is thought that the many features and advantages of the present invention will be readily apparent, but it will, of course, be understood that various changes in the form, proportion, and minor details of construction may be resorted to without departing from the spirit of the invention or scope of the appended claims.

I claim:

1. A wind shield construction including a shield frame having an opening, guide rods carried by the frame at each side of the opening, a window sash having members projecting laterally from each corner thereof for engaging said rods, a sleeve mounted on each guide rod between the said laterally projecting members located on one side of the sash and carrying therewith a set screw for engaging the rod, and springs interposed between each end of the sleeve and the adjacent laterally projecting member of the sash.

2. A cushion support for slidable wind shield sashes including in combination with a guide rod, a pair of spaced abutments carried by the side of said sash and engaging said rod, a locking member on said rod and located between said abutments for holding the sash in any desired position on the rod, and yieldable means interposed between each end of said member and the adjacent abutment.

3. A wind shield construction including a shield frame having an opening, guide rods at each side of the frame, supporting sleeves mounted on said rods, means carried by said sleeves for locking the same to the rods, a window sash panel slidably mounted on said guide rods, and resilient shock absorbing means interposed between the ends of the supporting sleeves and the portions of the window sash which loosely engage the guide rod.

4. A cushion support for slidable wind shield sashes including in combination with a guide rod, a pair of spaced abutments rigidly carried by the side of the said sash and slidably engaging said rod, an adjustable abutment on said rod between said sash abutments, and a spring confined between each sash abutment and adjacent end of the adjustable abutment.

In testimony whereof I hereunto affix my signature in the presence of two witnesses.

WILLIAM GRIES.

Witnesses:
 C. M. WRIGHT,
 HARRY SCHWEIGERT.